United States Patent [19]
Ward et al.

[11] 3,870,403
[45] Mar. 11, 1975

[54] ADJUSTABLE DENSITY ANTI-GLARE VISOR FOR VEHICLES

[76] Inventors: John H. Ward, c/o George Spector, 3615 Woolworth Bldg., 233 Broadway; George Spector, 3615 Woolworth Bldg., 233 Broadway, both of New York, N.Y. 10007

[22] Filed: June 25, 1973

[21] Appl. No.: 372,988

[52] U.S. Cl. .............. 350/276, 296/97 F, 350/315, 350/316, 350/318
[51] Int. Cl. ........................... G02b 5/22, B60j 3/04
[58] Field of Search ........ 350/315, 316, 276 R, 314, 350/283, 318; 296/97 F, 97 G

[56] References Cited
UNITED STATES PATENTS

| | | |
|---|---|---|
| 1,132,554 | 3/1915 | Brett .............................. 350/276 R |
| 1,332,225 | 3/1920 | Machacek ........................ 296/97 G |
| 1,573,272 | 2/1926 | Phillips ............................ 350/276 R |
| 1,766,162 | 6/1930 | Young ............................. 296/97 G |
| 2,220,429 | 11/1940 | Soderberg ....................... 350/276 R |

*Primary Examiner*—Ronald J. Stern

[57] ABSTRACT

A visor for installation within an automotive vehicle, the visor serving to shelter the eyes of a driver from the glare of headlights of approaching vehicles or sun light ray of a sun nearing a horizon; the device consisting of a frame supported to freely pivot universally, the frame holding a transparent sunray glass pane that is appropriately tinted.

3 Claims, 3 Drawing Figures

PATENTED MAR 11 1975 3,870,403

ADJUSTABLE DENSITY ANTI-GLARE VISOR FOR VEHICLES

This invention relates generally to automotive accessories. More specifically it relates to visors attached in cars and which are used to prevent sun glare getting into a driver's eyes.

It is well known that the conventional sun visor forming a standard equipment in a car is opaque so that in use, a driver must try to see around the areas that fringe the visor, such view accordingly completely blocking out the area behind the visor. While this blocks out the vision bulk of a light glare, it may also unfortunately be blocking out view of objects that should be visible such as overhead traffic lights and the like. This situation can of course be dangerous accordingly, and is in want of an improvement.

Therefore, it is a principle object of the present invention to provide a visor for effectively blocking out objectionable glaring light rays while at a same time allows visibility therethrough so that there is no blind spot covering objects that should be seen for reasons of safety.

Another object is to provide a visor that will prevent a driver to injure his eyes due to looking through the fringe area of a conventional opaque visor, and where an occasional direct light ray may hit the eyes as a car direction changes.

Yet another object is to provide a visor which can be made in different sizes having different sunray glass colors, and which is suitable for different models of automobiles, busses, trucks or other vehicles such as travel on the ground, in water and in air.

Other objects are to provide a LIGHT VISOR FOR DRIVING AT NIGHT AND IN BRIGHT SUNLIGHT which is simple in design, inexpensive to manufacture, rugged in construction, easy to use and efficient in operation.

These and other objects will be readily evident upon a study of the following specification and the accompanying drawing wherein.

Figure 1:
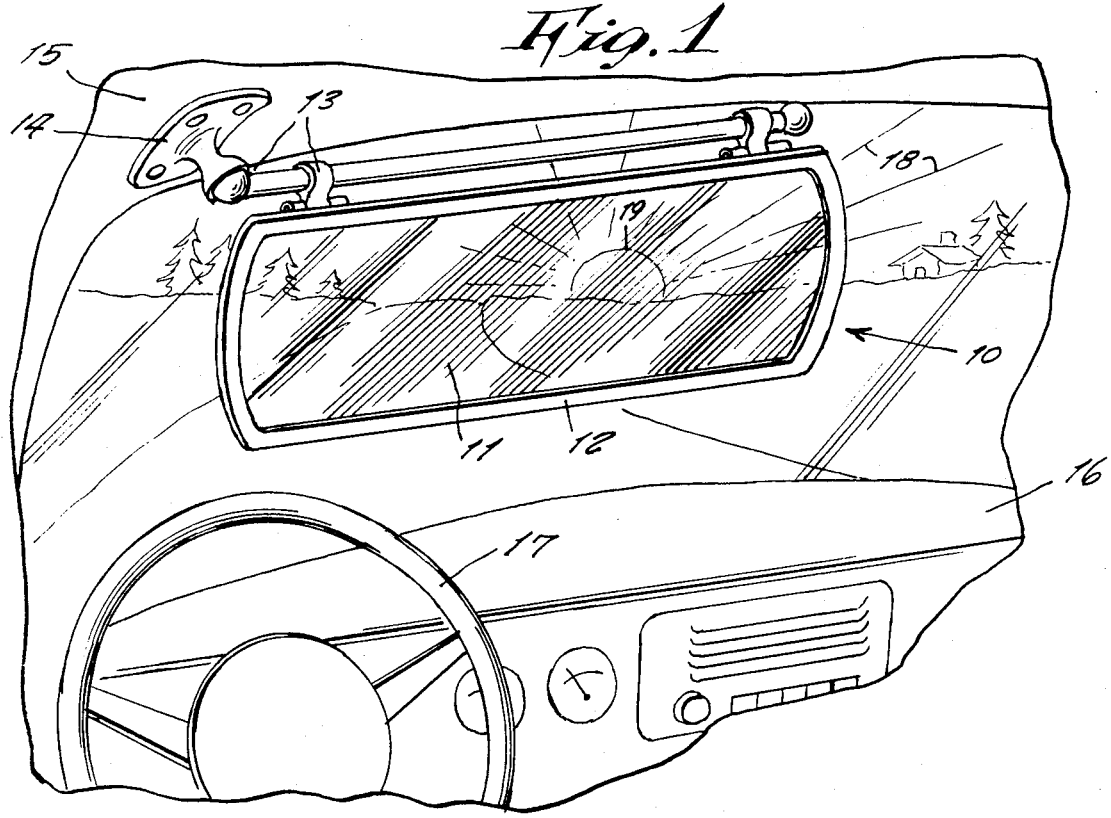
FIG. 1 is a perspective view of the invention shown in use to shield against a glaring sun on a horizon.

Referring now to the drawing in detail, and more particularly to FIG. 1 at this time, the reference numeral 10 represents a light visor for driving at night and in bright sunlight, according to the present invention, wherein there is a transparent sunray glass 11 of tinted color so it can be seen through but which prevents strong harmful light ray to pass therethrough; the glass 11 being fitted in a frame 12 which may be of chrome plated metal or other suitable material, the frame being universally pivotable by any standard hinges or joint such as shown at 13 formed on plate 14 securable to a ceiling 15 of a car 16 so that the visor can be swinged into any desired position to suit an individual driver behind a wheel 17 so that light rays 18 for a sun 19 or other source is filtered so to not injure the driver's eyes, while allowing the driver have a full field visibility so to see all objects, without a blind spit existing. When not in use, the device rests against the ceiling.

Figure 2:
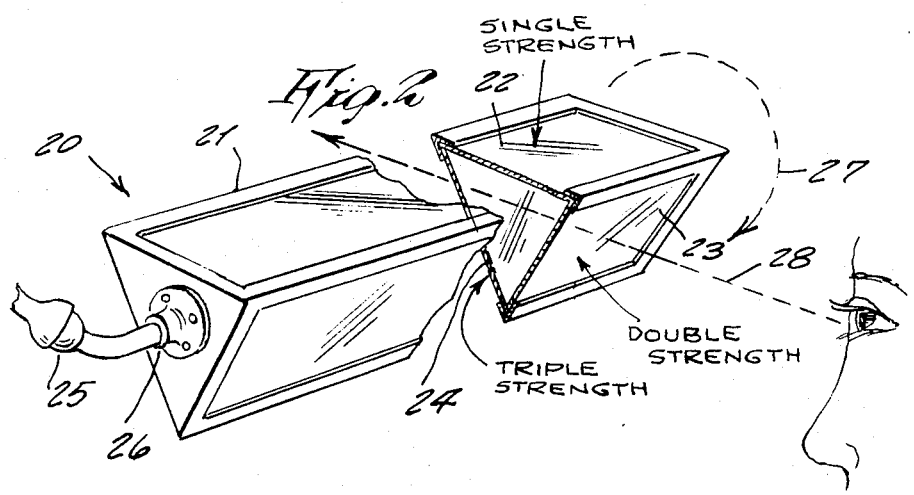
FIG. 2 is a modified design of the invention which consists of three tinted glasses each of different strength, the unit being rotatable so that by different combinations of the glasses a larger section of shading strength is possible for ideal shading intensity.

In FIG. 2 a modified design of light visor 20 includes a triangular frame 21 that supports three sunray glasses 22, 23 and 24 each of which is of a different filter intensity, the frame being rotatable about a universal joint 25 or at 26 as shown by arrow 27 so that selective alignment of the glasses is possible for a line of sight 28 passing through any two of the glasses so that three various combinations of filler strength is obtainable so to suit the intensity of a light glare, such filler combinations being of either 3, 4 or 5 strength combinations.

Figure 3:
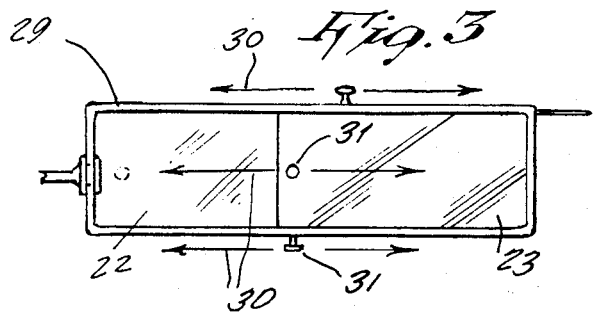
FIG. 3 is a front view of another modified design wherein four tinted glasses are used in a same manner as in FIG. 2, and wherein they are additionally individually sidewardly slidable so to get still further selection of shade intensity combinations.

If the frame 21 of FIG. 2 is elongated as shown at 29 in FIG. 3 so to be longer than the glasses 22, 23 and 24, and the glasses being sidewardly slidable in the frame 29 as shown by arrows 30, then individual of the glasses can be seen through instead in combination with others so to further increase the intensity selection range.

Additionally each glass may be gradually increased in intensity toward one longitudinal end so to give infinite intensity selection. A small knob 31 on each glass allows easy adjustment of glass positions.

While various changes may be made in the detail construction, it is understood that such changes will be within the spirit and scope of the present invention, as is defined by the appended claims.

We claim:

1. A transparent visor for reducing variably glare on the eyes of a vehicle driver, comprising a frame having a polygonal transverse and an extended longitudinal cross-section dimension with external sides in the longitudinal dimension having tinted transparent windows therein to reduce glare effect of light passing through said windows, each window being disposed at an angle to each adjacent window whereby light reaching the driver's eyes will pass through two windows, said frame being rotatably mounted on a shaft having an axis coincident with the longitudinal axis of said frame, whereby the frame can be rotated to predetermined positions wherein said light will pass successively through two windows at selected angles.

2. A visor as in claim 1, wherein the cross-section is triangular.

3. A visor as in claim 1, wherein said frame is longer than said windows in said longitudinal dimension and each window is slidable longitudinally to positions leaving a variable amount of viewing space unobstructed.

* * * * *